Feb. 4, 1930.  L. GRUBB  1,745,614
VEHICLE SIGNAL SWITCH
Filed Dec. 2, 1926
Fig. 1.
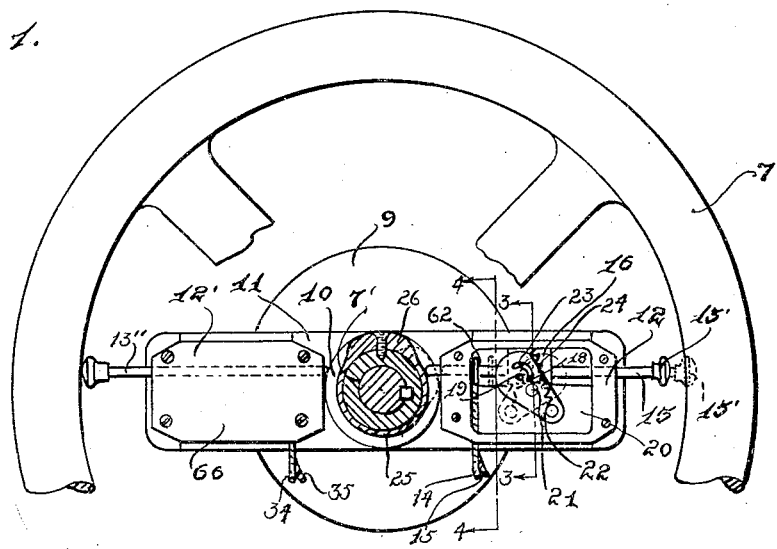
Fig. 2.
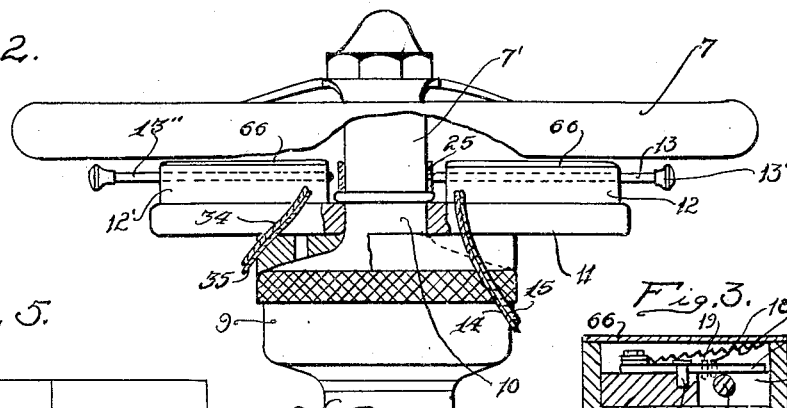
Fig. 5.
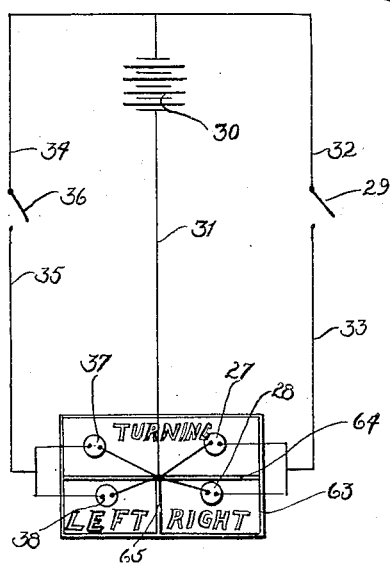
Fig. 3.
Fig. 4.
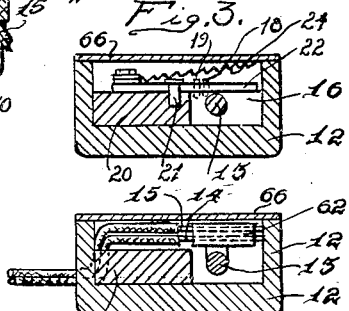
INVENTOR.
Lee Grubb.
BY
ATTORNEY.

Patented Feb. 4, 1930

1,745,614

UNITED STATES PATENT OFFICE

LEE GRUBB, OF DETROIT, MICHIGAN

VEHICLE SIGNAL SWITCH

Application filed December 2, 1926. Serial No. 152,238.

My invention relates to a new and useful improvement in a vehicle signal switch, and has for its object the provision of a device whereby the driver of a vehicle may indicate his intentions of turning either to the right or the left.

Another object of the invention is the provision of a mechanism whereby the device will automatically be rendered inoperative after the driver has made the turn which has been indicated.

Another object of the invention is the provision of a cam on the steering post so arranged and constructed as to open, upon a turning of the vehicle, a switch which may have been closed, preliminarily to the turning.

Another object of the invention is the provision of a mechanism for holding the switch either in closed or open position.

Other objects will appear hereinafter.

The invention consists in the combination and arrangement of parts hereinafter described and claimed.

The invention will be best understood by a reference to the accompanying drawings which form a part of this specification, and in which, Fig. 1 is a top plan view of the invention with one of the cover plates removed showing the vehicle wheel in fragment with a part in section.

Fig. 2 is a side elevational view of the invention showing it mounted for use with a part of the wheel broken away.

Fig. 3 is a sectional view taken on substantially line 3—3 of Fig. 1.

Fig. 4 is a sectional view taken on substantially line 4—4 of Fig. 1.

Fig. 5 is a diagrammatic view illustrating the wiring used in the invention.

As shown in the drawings the invention is adapted for use with a steering wheel 7 having a steering post 7' which extends from a steering post column 8. In the form illustrated, I have shown a gear housing 9 mounted at the upper end of the steering post column 8, projecting upwardly from which is a hub 10. This hub is stationary, and in the invention I mount an arm 11 which extends diametrically outwardly from opposite sides of this neck 10, this arm 11 being stationary also.

As shown in the drawings, this arm 11 is positioned slightly below the steering wheel 7. Carried on the arm 11 at opposite ends is a housing 12, and in this connection it may be stated that the mechanism at each end of the arm 11 is the same, so that a description of one end will suffice for a description of both ends.

Projected through the housing 12, and slidable relatively thereto, is a rod 13 carrying on its outer end a button 13'. Leading into the housing 12 are wires 14 and 15, the ends of these wires being free from insulation and in spaced relation to each other. The wires 14 and 15 form one of the feed wires of a circuit, so that the circuit is broken because of the separation of the bared ends of the wires which are positioned in the housing 12. Fixedly mounted upon the rod 13 interiorly of the housing is a block 16, preferably of insulating material, and projecting outwardly from one face of the block 16 are pins 18 and 19. Mounted in the housing 12 is a spacing block 20 upon which is pivotally mounted by means of the stud or screw 21, a metallic plate 22, this plate being preferably mounted concentrically relatively to its ends on the block 20. The pin 19 projects from an opening formed in the plate 22 and the pin 18 projects through an arcuate slot 23 formed in the plate 22.

As shown in the drawings, a spring 24 is connected at one end to one end of the plate 22 and at its opposite end to the wall of the housing 12. The connection is such that the spring 24 is normally under tension, so that when the end of the plate 22, to which it is fastened, swings past center at either side the spring 24 resists the movement past center toward the other side.

Mounted upon the steering post so as to rotate therewith is a collar 25 carrying an eccentric 26. Fixedly mounted upon the rod 13 and projecting outwardly therefrom is a metallic contact 62 which, upon movement of the rod 13, into operative position, as shown in Fig. 1, will engage the bared ends of each of the wires 14 and 15, so as to close a circuit between these wires.

The invention is adapted for use particularly with a vehicle signal having a housing 63 provided with a partition 64 and a partition 65 dividing the housing into three compartments. As shown in Fig. 5, these compartments bear indicia, and the compartments are provided with light bulbs. In the diagrammatic view a battery 30 is shown which is grounded by means of the wire 31 to the housing 63 and which is connected by wire 32 through the switch 29 and the wire 33 to the light bulb 27, and the light bulb 28. This battery is also connected through the wire 34, the switch 36 and the wire 35 to the light bulbs 37 and 38.

In operation, the operator of the vehicle upon approaching an intersection at which a turn is to be made, will press the rod 13 inwardly to the position shown in Fig. 1, thus bringing the contact member 62 into engagement with the bared ends of the wires 14 and 15, and closing the switch 29, as indicated in the diagrammatic view. As the rod 13 is moved inwardly the plate 22 will be moved past center so that a quick engagement of the contact member 62 with the bared ends of the wires 14 and 15, is made, and a firm engagement or contact retained. When this contact is made, the light bulb 27 will be lighted as well as the light bulb 28, thus indicating to the drivers of following vehicles or pedestrians, as the case may be, that the driver is intending to make a righthand turn. This operation would be effected upon approaching an intersection and when the driver makes the turn the cam 26 will engage the end of the rod 13, so as to force the contact 62 out of engagement with the bared ends of the wires 14 and 15, and again moving the plate 22 past center, upon which the spring 24 will quickly finish the movement. In this connection the pin 18 engaging in the opening formed in the plate 22 will serve to effect a rotation of the plate 22, whereas the pin in the arcuate slot 23 will serve as a stop, and at the same time as a locking member to assist the locking of the plate in the desired position. A similar rod 13″ is mounted on the opposite side of the arm 11, and the housing 12′ is carried by the arm 11. Each of these housings is provided with a cover 66. The mechanism of the device in the housing 12′ is the same as already illustrated for the mechanism in the housing 12, the wires 34 and 35 projecting into the housing 12′.

With a mechanism of this kind a positive operation of the device is effected because of the operator manually actuating it, and on account of the convenience of its location relatively to the steering wheel, the operator may drive the vehicle with the usual assurance of safety.

It is believed apparent that an automatic movement of the rod 13 to inoperative position will be effected when the turn is made.

While I have illustrated and described the preferred form of structure, I do not wish to limit myself to the precise form of structure shown, but desire to avail myself of such variations and modifications as may come within the scope of the appended claims.

Having thus described my invention what I claim as new and desire to secure by Letters Patent is:

1. In a device of the class described, a casing; a plunger projected through said casing and slidable therein; a plate pivotally mounted in said casing and provided with an arcuate slot and effecting swingable movement of said plate upon axial movement of said plunger; a pin carried by said plunger engaging in said arcuate slot; a contact member carried by said plunger, adapted upon movement of said plunger a predetermined distance in one direction for closing a circuit; resilient means mounted in said casing and connected to said plate for resisting movement of said plunger in either direction beyond the center of pivot of said plate.

2. A device of the class described, comprising: a casing; a plunger projected through said casing and slidable therein; a spacing block in said casing; a plate pivotally mounted in said casing and provided with an arcuate slot; a block mounted fixedly on said plunger; a pin projecting upwardly from said block and engaging in said slot; a contact member carried by said plunger, adapted upon movement of said plunger a predetermined distance in one direction, for closing a circuit; resilient means mounted in said casing and connected to said plate for resisting movement of said plunger in one direction after its complete movement in the opposite direction, said plate swinging past center relatively to its connections to said resilient means upon movement of said plunger to its full extent in either direction.

In testimony whereof I have signed the foregoing.

LEE GRUBB.